(12) United States Patent
Miyai et al.

(10) Patent No.: US 8,722,193 B2
(45) Date of Patent: May 13, 2014

(54) GAS BARRIER LAMINATE AND A METHOD OF PRODUCING THE SAME

(75) Inventors: Tomohiro Miyai, Kanagawa (JP); Yusuke Obu, Kanagawa (JP); Kashiko Kawai, Kanagawa (JP); Shunya Nangou, Kanagawa (JP)

(73) Assignee: Toyo Seikan Kaisha, Ltd., Tokyo (JP)

(*) Notice: Subject to any disclaimer, the term of this patent is extended or adjusted under 35 U.S.C. 154(b) by 83 days.

(21) Appl. No.: 13/497,312

(22) PCT Filed: Sep. 30, 2010

(86) PCT No.: PCT/JP2010/067111
§ 371 (c)(1),
(2), (4) Date: Mar. 21, 2012

(87) PCT Pub. No.: WO2011/040540
PCT Pub. Date: Apr. 7, 2011

(65) Prior Publication Data
US 2012/0219806 A1  Aug. 30, 2012

(30) Foreign Application Priority Data
Oct. 2, 2009  (JP) .................................. 2009-230174

(51) Int. Cl.
*B32B 27/08* (2006.01)
*B05D 3/10* (2006.01)

(52) U.S. Cl.
USPC .......................... 428/424.4; 428/522; 427/333

(58) Field of Classification Search
USPC ................................ 428/522, 424.4; 427/333
See application file for complete search history.

(56) References Cited

U.S. PATENT DOCUMENTS

| 6,194,061 B1* | 2/2001 | Satoh et al. ................... 428/341 |
| 7,569,267 B2 | 8/2009 | Tanaka et al. |
| 2010/0015449 A1 | 1/2010 | Obu et al. |
| 2010/0239852 A1 | 9/2010 | Okuzu et al. |
| 2011/0091743 A1 | 4/2011 | Obu et al. |
| 2011/0200836 A1 | 8/2011 | Obu et al. |

FOREIGN PATENT DOCUMENTS

| EP | 1865020 A1 * | 12/2007 |
| JP | 2002-240207 | 8/2002 |
| JP | 2003-171419 | 6/2003 |
| JP | 2007-313758 | 12/2007 |
| WO | 2005/037534 | 4/2005 |
| WO | 2008/026672 | 3/2008 |
| WO | 2009/041500 | 4/2009 |
| WO | 2010/001836 | 1/2010 |

OTHER PUBLICATIONS

Search report from International Patent Application No. PCT/JP2010/067111, mail date is Dec. 21, 2010.

* cited by examiner

*Primary Examiner* — Thao T. Tran
(74) *Attorney, Agent, or Firm* — Greenblum & Bernstein, P.L.C.

(57) ABSTRACT

To provide a gas barrier laminate having a gas barrier layer obtained by crosslinking the carboxyl groups of a polycarboxylic acid-type polymer with polyvalent metal ions maintaining good productivity, the crosslinking being accelerated with polyvalent metal ions to exhibit more excellent gas barrier property. A gas barrier laminate comprising a layer (A) of a non-aqueous resin containing a metal element in the polymer skeleton thereof, and a layer (B) of a polycarboxylic acid-type polymer in which an ionic crosslinking is formed with a polyvalent metal among the carboxyl groups.

9 Claims, 2 Drawing Sheets

GAS BARRIER LAMINATE AND A METHOD OF PRODUCING THE SAME

TECHNICAL FIELD

This invention relates to a gas barrier laminate having a gas barrier layer obtained by crosslinking the carboxyl groups of a polycarboxylic acid-type polymer with metal ions and to a method of producing the same. More specifically, the invention relates to a gas barrier laminate in which the crosslinking with metal ions is accelerated to further improve the productivity and gas barrier property and to a method of producing the same.

BACKGROUND ART

A variety of gas barrier members have heretofore been known and, particularly, polyvinylidene chloride, polyacrylonitrile and ethylene/vinyl alcohol copolymer have been known as gas barrier resins. From the standpoint of ecological problems, however, it is a trend to refrain from using the polyvinylchloride and polyacrylonitrile. The ethylene/vinyl alcohol copolymer, on the other, has gas barrier property that greatly varies depending on the humidity, i.e., has a problem of a decrease in the gas barrier property under highly humid conditions.

In order to solve the above problems, there have been proposed a gas barrier resin composition which is obtained by reacting a polycarboxylic acid-type polymer, a crosslinking agent having 2 to 4 functional groups that react with the carboxyl groups, and metal ions of a valency of two or more so that the polycarboxylic acid polymer forms crosslinked portions due to the crosslinking agent and crosslinked portions due to the metal ions of a valency of two or more, and in which the weight ratio of the polycarboxylic acid-type polymer and the crosslinking agent is from 99.9/0.1 to 65/35 (patent document 1), and a gas barrier film obtained by forming a gas barrier coating on at least one surface of a thermoplastic resin film, the coating being formed of a polyacrylic acid that is crosslinked with a crosslinking agent containing an epoxy compound having three or more epoxy groups per a molecule thereof, and the crosslinking agent being contained in an amount of 1 to 100 parts by mass per 100 parts by mass of the polyacrylic acid (patent document 2).

The gas barrier members disclosed in the above patent documents 1 and 2 must be crosslinked to a high degree at a high temperature of not lower than 150° C. or by being heated for extended periods of time accompanied by such problems as seriously affecting the plastic base material, and lowering the productivity and consuming large amounts of energy and water since a dip treatment or a spray treatment at the time of ionic crosslinking with metal ions are necessary. Besides, the gas barrier members are not still satisfactory in regard to flexibility and retort resistance.

As a gas barrier laminated film on which dry-printing can be effected at a relatively low temperature, further, there has been proposed a gas barrier laminated film comprising a layer (a) formed from a coating solution (A) containing a polycarboxylic acid-type polymer without heat treatment and a layer (b) formed from a coating solution (B) containing a water-soluble polyvalent metal salt and an aqueous resin, the layer (a) formed from the coating solution (A) and the layer (b) formed from the coating solution (B) forming at least a pair of lamination units abutting to each other (patent document 3).

PRIOR ART DOCUMENTS

Patent document 1: JP-A-2003-171419
Patent document 2: JP-A-2002-240207
Patent document 3: JP-A-2007-313758

OUTLINE OF THE INVENTION

Problems that the Invention is to Solve

The gas barrier laminated film described in the above patent document 3 can be dry-printed at a relatively low temperature; i.e., the gas barrier laminated film is obtained without affecting the base material. With this laminated film, however, the polycarboxylic acid-type polymer that is applied first is fixed and does not sufficiently migrate into the layer (b) of the polyvalent metal salt. Therefore, the crosslinking with polyvalent metal ions is not attained to a sufficient degree, and the gas barrier property is not still satisfactory unless the ionic crosslinking ratio is enhanced by employing a dip treatment or a spray treatment which is the conventional method as the treatment after the printing. To attain a sufficiently close adhesion to the base material, further, an undercoating must be formed requiring different steps for forming various layers, which is still far from satisfactory from the standpoint of productivity and cost.

It is, therefore, an object of the present invention to provide a gas barrier laminate having a gas barrier layer obtained by crosslinking the carboxyl groups of a polycarboxylic acid-type polymer with polyvalent metal ions, the gas barrier laminate exhibiting more excellent gas barrier property.

Another object of the invention is to provide a method of producing a gas barrier laminate having a gas barrier layer obtained by crosslinking the carboxyl groups of a polycarboxylic acid-type polymer with polyvalent metal ions, the method being capable of producing the gas barrier laminate that closely adheres to a base material and has excellent gas barrier property, retort resistance and flexibility based on only the heating conducted at a low temperature for a short period of time through a decreased number of simplified steps maintaining good efficiency.

Means for Solving the Problems

According to the present invention, there is provided a gas barrier laminate comprising a layer (A) of a resin containing a metal element in a non-aqueous polymer skeleton thereof, and a layer (B) of a polycarboxylic acid-type polymer in which an ionic crosslinking is formed with a polyvalent metal among the carboxyl groups.

In the gas barrier laminate of the present invention, it is desired that:
1. A monovalent metal element is contained in the non-aqueous polymer skeleton of the layer (A);
2. An urethane bond is formed in the non-aqueous resin of the layer (A);
3. An alkaline compound of the polyvalent metal is contained in the layer (A);
4. The alkaline compound of the polyvalent metal comprises at least one of a carbonate of calcium or magnesium, or a hydroxide thereof;
5. The polycarboxylic acid-type polymer is a poly(meth) acrylic acid or a partly neutralized product thereof; and
6. The polyvalent metal in the layer (B) comprises at least one of calcium or magnesium.

According to the present invention, there is, further, provided a method of producing a gas barrier laminate, comprising forming a layer (A) on at least one surface of a plastic base material, the layer (A) being formed by dispersing an alkaline compound of a polyvalent metal in a non-aqueous resin which contains a metal element in the polymer skeleton thereof, applying a solution (b) onto the layer (A), the solution (b) being obtained by dissolving a polycarboxylic acid-type polymer in a solvent which contains at least water and, thereafter, removing the solvent by the heat treatment to thereby form a metal ionic crosslinking with polyvalent metal ions among the carboxyl groups in the solution (b).

According to the present invention, there is, further, provided a packing material having the above gas barrier laminate on the surface of a plastic base material or between the plastic layers.

Effects of the Invention

The gas barrier laminate of the present invention exhibits gas barrier property superior to that of the conventional gas barrier laminates obtained by crosslinking the carboxyl groups of the polycarboxylic acid-type polymer with polyvalent metal ions.

In the method of producing the gas barrier laminate of the invention, further, an alkaline compound of a polyvalent metal is dispersed in a non-aqueous resin in which a metal element is contained in the polymer skeleton thereof accelerating the migration of the polyvalent metal ions into the solution (b). Therefore, the polycarboxylic acid-type polymer is efficiently crosslinked with polyvalent metal ions and the productivity is improved.

Further, the method of producing the gas barrier laminate of the invention requires no dip treatment or spray treatment that was so far necessary for crosslinking the carboxyl groups of the polycarboxylic acid-type polymer with multivalent metal ions, i.e., the number of the steps can be decreased.

According to the method of producing the gas barrier laminate of the invention, further, the carboxyl groups of the polycarboxylic acid-type polymer can be crosslinked with metal ions like when the dip treatment or the spray treatment is executed. Therefore, the gas barrier laminate produced by the production method of the invention can easily form a crosslinked structure based on only the heating conducted at a low temperature for a short period of time making it possible to produce an excellent gas barrier member requiring decreased amount of energy and time without adversely affecting the plastic base material and maintaining good productivity.

Further, excellent adhesion to the plastic base material can be expressed without the need of separately providing an anchor coating.

Moreover, the gas barrier laminate of the invention exhibits excellent gas barrier property, water resistance, flexibility, maintains excellent gas barrier property even after the laminate is placed under high temperature and wet heated conditions such as those of retort sterilization, and can impart retort resistance.

Figure 1:
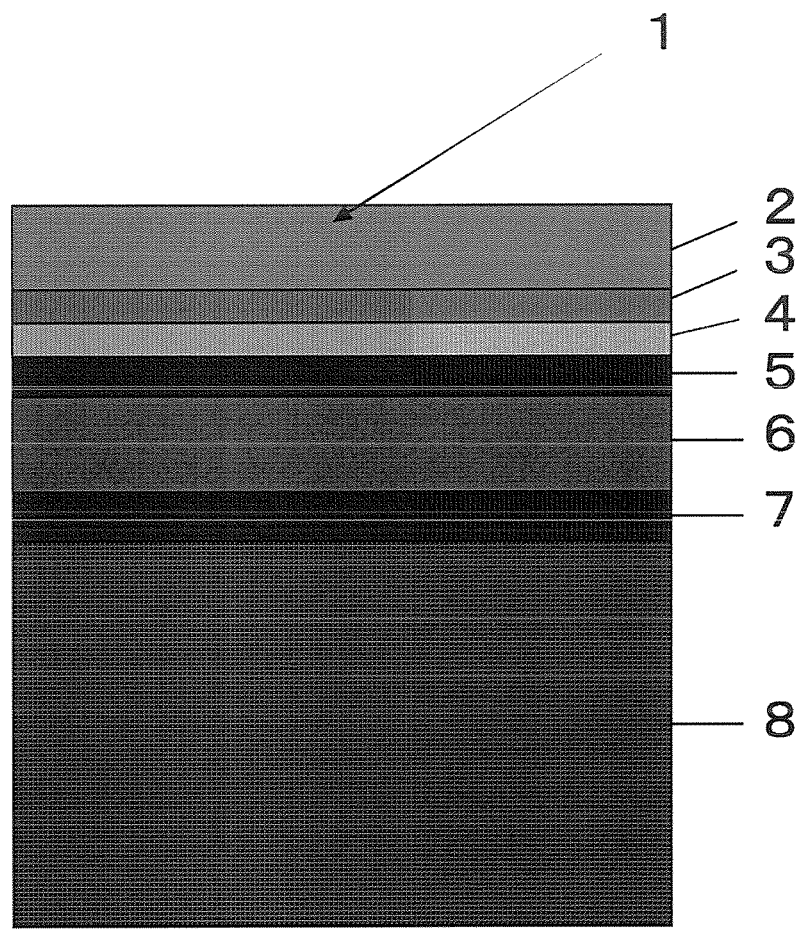
FIG. 1 is a view showing the structure in cross section of a laminate fabricated in Example 1.

MODE FOR CARRYING OUT THE INVENTION (Gas Barrier Laminates)

The gas barrier laminate of the present invention comprises a layer (A) of a non-aqueous resin containing a metal element in the polymer skeleton thereof, and a layer (B) of a polycarboxylic acid-type polymer forming crosslinking with ions of a polyvalent metal among the carboxyl groups.

As described above, the gas barrier laminate of the present invention is produced by forming a layer (A) on at least one surface of a plastic base material, the layer (A) being obtained by dispersing an alkaline compound of a polyvalent metal in a non-aqueous resin which contains a metal element in the polymer skeleton thereof, applying a solution (b) onto the layer (A), the solution (b) being obtained by dissolving a polycarboxylic acid-type polymer in a solvent which contains at least water and, thereafter, removing the solvent by the heat treatment to thereby form a metal ionic crosslinking among the carboxyl groups in the solution (b) with polyvalent metal ions in the layer (A) migrated into the solution (b) thereby to form a layer (B). According to the present invention, in a coating composition (a) that contains the alkaline compound of a polyvalent metal for forming the layer (A), the resin component used therein is a non-aqueous resin and, besides, the non-aqueous resin contains the metal element in the polymer skeleton thereof permitting the polyvalent metal ions in the layer (A) to efficiently migrate into the solution (b).

That is, the non-aqueous resin containing the metal element in the polymer skeleton thereof for constituting the layer (A), works by itself as an anchor coating enabling the layer (B) to closely adhere onto the plastic base material. Since the non-aqueous resin contains the metal element, further, the resin easily swells in the water-containing solvent. Therefore, when the solvent (b) which forms the layer (B) is applied, the resin swells enabling the polyvalent metal ions present in the layer (A) to effectively migrate into the solution (b).

Whether the metal element is contained in the polymer skeleton of the non-aqueous resin can be detected, for example, by analyzing the starting resin by the fluorescent X-ray analysis.

The above actions and effects of the invention are also obvious from the results of Examples appearing later.

That is, when the layer (A) prior to applying the solution (b) is a layer in which the alkaline compound of the polyvalent metal is dispersed in the non-aqueous resin containing no metal element, the ionic crosslinking ratio reaches 30% if the rate of application is slow, i.e., if the time for forming the film is lengthened, and excellent gas barrier property can be expressed before and after the retort treatment. If the rate of application is increased and the time for forming the film is shortened, the ionic crosslinking ratio remains less than 20%, and satisfactory gas barrier property is obtained neither before nor after the retort treatment (Comparative Example 1). Further, when the layer (A) prior to applying the solution (b) is a layer in which the alkaline compound of the polyvalent metal is dispersed in the non-aqueous resin which contains a monovalent metal element but does not contain the monovalent metal element in the polymer skeleton thereof, the monovalent metal by itself migrates into the solution (b). Therefore, the ionic crosslinking ratio by the multivalent metal, rather, decreases, and satisfactory gas barrier property is not obtained (Comparative Example 2).

On the other hand, when the layer (A) prior to applying the solution (b) is a layer in which the alkaline compound of the multivalent metal is dispersed in the non-aqueous resin which contains the metal element in the polymer skeleton thereof, the ionic crosslinking ratio reaches as high as 65% in forming the film in a short period of time. Within a conventionally employed time for forming the film, the ionic crosslinking ratio reaches 90% from which it is obvious that the laminate having excellent gas barrier property can be formed maintaining good productivity (Examples 1 to 9).

(Coating Composition (a))

In the invention, the coating composition (a) for forming the layer (A) that contains an alkaline compound of a polyvalent metal is obtained by dispersing an alkaline compound of a polyvalent metal in a coating component that contains, as the resin component, a non-aqueous resin which contains a metal element in the polymer skeleton thereof.

In the invention, it is particularly important that the resin component which is a coating material component is a non-aqueous resin which contains a metal element in the polymer skeleton thereof and that the polyvalent metal is an alkaline compound. Namely, during the heat treatment for removing the solvent from the layer (B) formed by using the solution (b), the polyvalent metal ions migrate from the layer (A) into the solution (b), i.e., the alkaline compound of the polyvalent metal migrates from the layer (A) into the solution (B), and quickly dissolves therein to emit the polyvalent metal ions; i.e., the polyvalent metal ions diffuse in the whole layer (B).

It is important that the coating material that contains the alkaline compound of the polyvalent metal is a coating material which contains, as a resin component, a non-aqueous resin that contains the metal element in the polymer skeleton thereof. The resin component that is desirably used may be the one of the type of urethane, epoxy, acryl or polyester. Upon introducing a metal base into the monomer that constitutes the polymer, the metal element can be contained in the polymer skeleton that is formed. In the present invention, the word "non-aqueous" is a concept which excludes emulsion or latex dispersed in a water-containing solvent or excludes water-soluble resin. This effectively prevents a decrease in the mechanical strength of the layer (A) that is caused by an excess of swelling upon coming in contact with the water-containing solvent. The metal base to be preferably introduced into the monomer of the resin should, desirably, have a polar functional group for improving the dispersion of the polyvalent metal, and its examples include a metal salt of sulfonic acid and a metal salt of phosphoric acid. As the metal element, further, there can be exemplified lithium Li, potassium K, sodium Na, magnesium Mg, calcium Ca, copper Cu and iron Fe. Particularly desirably, the metal element is a monovalent metal element. In the invention, it is specifically desired to introduce a sodium sulfonate.

In the invention, in particular, it is desired that an isocyanate compound is contained in order to attain excellent adhesion to the base material and to improve the dispersion of the alkaline compound of the polyvalent metal. By using the isocyanate compound as a curing agent, further, the coating material component may be comprised of a base compound and the curing agent, and may be in the form of a precursor in a state where the curing reaction has not been completed or may be in a state where the curing agent is present in an excess amount.

In the invention, further, to attain excellent adhesion to the base material and to improve dispersion of the alkaline compound of the polyvalent metal, it is particularly desired that an urethane bond is formed in the layer (A). The urethane polymer may be contained in the coating material in advance. It is, however, also allowable to use a polyol component such as a polyester polyol, a polyether polyol, an urethane-modified polyester polyol or an urethane-modified polyether polyol as a base compound for the isocyanate compound. Preferably, the isocyanate compound is so present that the number of isocyanate groups in the isocyanate compound is in excess of the number of hydroxyl groups in the polyol component.

As the polyol component used for forming the urethane polymer, it is desired to use the polyester polyol or the one modified with the urethane. As the polyester polyol components, there can be exemplified polyester polyols obtained by reacting a polyvalent carboxylic acid, a dialkylester thereof or a mixture thereof with glycols.

The glass transition temperature of the polyester polyol is, preferably, −50° C. to 100° C. and, more preferably, −20° C. to 80° C. Further, the polyester polyol has a number average molecular weight of, preferably, 1,000 to 100,000 and, more preferably, 3,000 to 80,000.

As the polyvalent carboxylic acid, there can be exemplified aromatic polyvalent carboxylic acids, such as isophthalic acid, terephthalic acid and naphthalenedicarboxylic acid, and aliphatic polyvalent carboxylic acids, such as adipic acid, azelaic acid, sebacic acid and cyclohexanedicarboxylic acid.

As the glycol, there can be exemplified ethylene glycol, propylene glycol, diethylene glycol, butylene glycol, neopentyl glycol and 1,6-hexanediol.

In the invention, a non-aqueous resin containing a metal element in the polymer skeleton thereof is obtained by copolymerizing the polyol component or the polyvalent carboxylic acid component with a component in which the metal base is introduced.

As the polyvalent carboxylic acid in which the metal base is introduced, there can be exemplified metal salts such as sulfoterephthalic acid, 5-sulfoisophthalic acid, 4-sulfonaphthalene-2,7-dicarboxylic acid, and [4-sulfophenoxy]isophthalic acid. Further, as the polyol in which the metal base is introduced, there can be exemplified such metal salts as 2-sulfo-1,4-butanediol, and 2,5-dimethyl-3-sulfo-2,5-hexanediol. Specifically preferred example is 5-sodiumsulfoisophthalic acid.

It is desired that the component in which the metal base is introduced has been copolymerized in an amount of 0.01 to 10 mol %. If the amount thereof is smaller than the above range, the migration of the polyvalent metal ions cannot be sufficiently promoted. If the amount thereof is larger than the above range, on the other hand, the water resistance tends to be deteriorated.

As the isocyanate compound to be contained in the coating material or as the isocyanate compound that can be used as the curing agent for forming the urethane polymer or in combination with other base compounds, there can be exemplified aromatic polyisocyanates such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, xylylene diisocyanate and tetramethylxylylene diisocyanate; aliphatic polyisocyanates such as tetramethylene diisocyanate, 1,6-hexamethylene diisocyanate, dodecamethylene diisocyanate, trimethylhexamethylene diisocyanate, 1,3-cyclohexylene diisocyanate, 4-cyclohexylene diisocyanate, hydrogenated xylylene diisocyanate, lysine diisocyanate, isophorone diisocyanate, 4,4'-dicyclohexylmethane diisocyanate, and 3,3'-dimethyl-4,4'-dicyclohexylmethane diisocyanate; polyfunctional polyisocyanate compounds such as isocyanurate derived from the above polyisocyanate monomer, biuret, and allophanate; or polyfunctional polyisocyanate compounds containing a terminal isocyanate group obtained by the reaction with a trifunctional or more highly functional polyol compound, such as trimethylolpropane and glycerin.

In the present invention, it is not desired to chemically treat of the particles of the alkaline compound of the polyvalent metal from such a standpoint that the alkaline compound of the polyvalent metal quickly dissolves in the solution (b) as it migrates therein.

In the invention, further, particles of the alkaline compound of the polyvalent metal often remain in the layer (A) of the gas barrier laminate. Though dependent upon the amount of the particles that are remaining, the transparency of the gas barrier laminate often decreases to a slight degree if the primary grain size of the particles exceeds 0.5 μm. It is, therefore, desired that the alkaline compound particles of the polyvalent metal have a primary grain size of not more than 0.5 μm and, specifically, not more than 0.4 μm. The primary grain size of the alkaline compound particles of the polyvalent metal can be found by observing a secondary electron image thereof obtained by using a scanning-type electron microscope.

There is no specific limitation on the polyvalent metal ions so far as they are capable of crosslinking the carboxyl groups of the polycarboxylic acid-type polymer, and there can be exemplified metal ions such as of alkaline earth metals (magnesium Mg, calcium Ca, strontium Sr, barium Ba, etc.), metals from group 8 of periodic table (iron Fe, ruthenium Ru, etc.), metals from group 11 of periodic table (copper Cu, etc.), metals from group 12 of periodic table (zinc Zn, etc.), and metals from group 13 of periodic table (aluminum Al, etc.) and, specifically, those having a valence of 2 to 3 and, preferably, divalent metal ions such as of calcium, magnesium and zinc. The metal ions can be used in one kind or in a combination of two or more kinds.

As the alkaline compound of the polyvalent metal, there can be exemplified hydroxides of the above metals (e.g., magnesium hydroxide, calcium hydroxide, etc.), carbonates of the above metals (e.g., magnesium carbonate, calcium carbonate, etc.), and organic acid salts of the above metals such as carboxylates (e.g., acetates such as zinc acetate, calcium acetate, or lactates such as zinc lactate, calcium lactate, etc.). From the stand point of safety when used as a packaging material for foods and that no by-product stays in the layer (B) when the crosslinking is formed with metal ions, however, it is, particularly, desired to use at least either one of a carbonate or a hydroxide of calcium or magnesium.

In the coating composition (a) used in the invention, it is desired that the alkaline compound of the polyvalent metal is contained in an amount of not less than 0.4 equivalent per the carboxyl groups of the polycarboxylic acid-type polymer in the solution (b) calculated as metal atoms presuming that two carboxyl groups react with one polyvalent metal ion. For the use as a packing material which is put to the retort sterilization, in particular, it is desired that the content thereof is not less than 0.6 equivalent to maintain the gas barrier property after the retort sterilization. If the content of the alkaline compound of the polyvalent metal is less than the above range, the carboxylic acid polymer cannot be crosslinked to a sufficient degree and it becomes difficult to maintain the gas barrier property.

It is, further, desired that the resin component in the coating composition (a) is prepared so that the content thereof is in an amount of 15 to 80% by weight, specifically, 20 to 60% by weight.

In the coating composition (a), further, it is important that the resin component is a non-aqueous resin which is prepared by using a solvent such as toluene, 2-butanone, cyclohexanone, Solvesso®, isophorone, xylene, ethyl acetate or butyl acetate and, specifically, by using a low-boiling solvent so that the layer can be formed at a low temperature. The solvents may be dissolved in a single kind or in combination, or mixed together with each solution of the components.

In addition to the above components, there can be, further, used a catalyst for accelerating the curing, filler, softening agent, anti-aging agent, stabilizer, adhesion accelerator, leveling agent, de-foaming agent, plasticizer, inorganic filler, tackifying resin, fibers, coloring agent such as pigment and usable time-extending agent that have been known per se.

(Solution (b))

In the invention, the solution (b) applied onto the layer (A) formed by using the above coating composition (a), is a solution in which the polycarboxylic acid-type polymer is dissociated by dissolving the polycarboxylic acid-type polymer in a solvent which contains at least water.

As the polycarboxylic acid-type polymer contained in the solution (b), there can be exemplified homopolymers or copolymers of monomers having a carboxyl group, such as polyacrylic acid, polymethacrylic acid, polymaleic acid, polyitaconic acid and acrylic acid/methacrylic acid copolymer, and, specifically, polyacrylic acid and polymethacrylic acid. To accelerate the dissociated state of the polycarboxylic acid-type polymer in the solution, further, there may be used a partly neutralized product thereof.

The polycarboxylic acid-type polymer can be partly neutralized with a metal hydroxide such as sodium hydroxide or potassium hydroxide, or with ammonium.

Though there is no particular limitation, it is desired that the degree of neutralization of the partly neutralized product is not more than 60% and, specifically, not more than 40% in terms of a molar ratio to the carboxyl groups. If the degree of neutralization exceeds the above range, the crosslinking is not formed to a sufficient degree with the ions of the alkaline compound of the polyvalent metal.

Though there is no particular limitation, it is desired that the polycarboxylic acid-type polymer has a "weight average molecular weight" in a range of 2,000 to 5,000,000 and, specifically, 10,000 to 1,000,000.

By using two isolation columns, i.e., "TSK G4000PWXL" and "TSK G3000PWXL" (manufactured by Tosoh Co.) and using 50 mmols of a phosphoric acid aqueous solution as an eluent, the "weight average molecular weight" is found from a chromatogram and a standard calibration curve of the polycarboxylic acid-type polymer at 40° C. and at a flow rate of 1.0 ml/min.

As the solvent for use in the solution (b), there may be used water alone but, preferably, a mixed solvent of water and an alcohol such as methanol, ethanol or isopropanol, a ketone such as 2-butanone or acetone, or an aromatic solvent such as toluene and, specifically, there may be used a solvent having a boiling point lower than that of water in combination with water.

Preferably, there is used a solvent having good affinity to the layer (A) that contains the alkaline compound of the polyvalent metal from the standpoint of improving affinity to the layer (A) and accelerating the migration of the alkaline compound of the polyvalent metal into the solution (b). When, for example, the urethane polymer is used, the solvent having good affinity to the layer (A) may, preferably, be an alcohol such as methanol, ethanol or isopropanol, or a ketone such as 2-butanone or acetone though dependent upon the resin component used for the coating composition (a).

When a mixed solvent of water and other solvent is used as the solvent, it is desired that the other solvent is used in an amount of not more than 1900 parts by weight and, specifically, in an amount of 10 to 900 parts by weight per 100 parts by weight of water.

The solution (b) may be blended with a crosslinking agent which reacts with unreacted carboxyl groups in the polycarboxylic acid-type polymer to form a crosslinked structure by covalent bond. Namely, polyvalent metal ions migrated out of the layer (A) form a crosslinked structure with the carboxyl groups in the polycarboxylic acid polymer by ionic crosslinking. Here, the carboxyl groups that were not used for the ionic crosslinking are crosslinked with the crosslinking agent to form the crosslinked structure having covalent bonds at the crosslinked portions, i.e., the unreacted carboxyl groups to improve the resistance against hot water of the gas barrier layer that is formed. When the resistance must be improved to withstand the severe treatment with hot water, the above crosslinked structure is formed to cope with the matter. Particularly desired examples of the crosslinking agent include a compound having two ring structures in which an ether bond is formed at carbons that forms double bonds with nitrogen so as to include oxygen in the ether bond, i.e., having two ring structures with a group —N═C—O— or an oxoimino group that has a part ═C—O— in the ring, and an alicyclic epoxy compound containing an epoxy compound component which has an alicyclic group in the molecules and in which neighboring carbon atoms of the alicyclic group are forming an oxirane ring. By using these crosslinking agents, at least two ester bonds or amide ester bonds can be formed at the crosslinked part.

These crosslinking agents can be used in a single kind or in combination.

Exemplified below are the ring structures though not limited thereto only.

[Chemical 1]

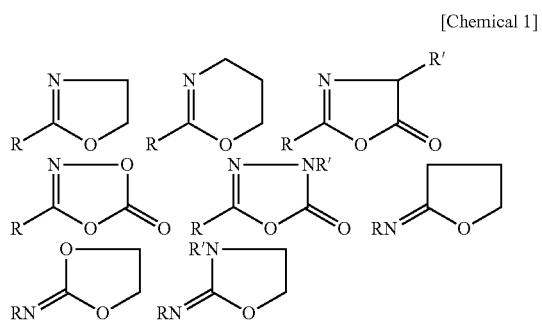

Despite the heterocyclic ring represented by the following formula,

[Chemical 2]

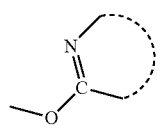

there takes place no crosslinking reaction that forms an amide ester bond to the polycarboxylic acid-type polymer if the ring contains no oxygen of the ether bond. The crosslinking does not take place, either, if there is only one ring structure. If there are three or more ring structures, then the structure of the crosslinking points expands three-dimensionally, and a densely crosslinked structure having excellent gas barrier property is not formed, which is not desirable. Because of these reasons, it is important that nitrogen and a carbon are forming a double bond, that a carbon is forming an ether bond, that an ether bond is formed on a carbon which is forming a double bond with nitrogen, and that these conditions are not only individually holding but also an ether bond is formed on a carbon which is forming a double bond with nitrogen, and there are contained two ring structures having the oxygen in the ether bond.

In the compound having the above ring structures in a number of two, the two ring structures may be the same or different, but it is desired that at least one of them is an oxazoline group or a derivative thereof.

As the compounds having two such ring structures, though not limited thereto only, there can be exemplified bisoxazolines such as 2,2'-bis(2-oxazoline), 2,2'-bis(4-methyl-2-oxazoline), 2,2'-bis(5-methyl-2-oxazoline), 2,2'-bis(5,5'-dimethyl-2-oxazoline), 2,2'-bis(4,4,4',4'-tetramethyl-2-oxazoline), 2,2'-p-phenylenebis(2-oxazoline), 2,2'-m-phenylenebis(2-oxazoline), 2,2'-o-phenylenebis(2-oxazoline), 2,2'-p-phenylenebis(4-methyl-2-oxazoline), 2,2'-p-phenylenebis(4,4-dimethyl-2-oxazoline), 2,2'-m-phenylenebis(4-methyl-2-oxazoline), 2,2'-m-phenylenebis(4,4'-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4-dimethyl-2-oxazoline), 2,2'-3,3'-diphenoxyethanebis(2-oxazoline), 2,2'-cyclohexylenebis(2-oxazoline), and 2,2'-diphenylenebis(2-oxazoline); and bisoxazines such as 2,2'-methylenebis(5,6-dihydro-4H-1,3-oxazine), 2,2'-ethylenebis(5,6-dihydro-4H-1,3-oxazine), 2,2'-propylenebis(5,6-dihydro-4H-1,3-oxazine), 2,2'-butylenebis(5,6-dihydro-4H-1,3-oxazine), 2,2'-hexamethylenebis(5,6-dihydro-4H-1,3-oxazine), 2,2'-p-phenylenebis(5,6-dihydro-4H-1,3-oxazine), 2,2'-m-phenylenebis(5,6-dihydro-4H-1,3-oxazine), 2,2'-naphthylenebis(5,6-dihydro-4H-1,3-oxazine), and 2,2'-p.p'-diphenylenebis(5,6-dihydro-4H-1,3-oxazine).

In the present invention, from the standpoint of mechanical properties and coloring, it is desired that an aliphatic chain is forming the crosslinked part that is formed by the polycarboxylic acid-type polymer and the above compound having the two ring structures. Among the above compounds, therefore, there can be preferably used those compounds without aromatic ring. Of them, the 2,2'-bis(2-oxazoline) can be particularly preferably used.

Further, the alicyclic epoxy compound is a compound containing an epoxy compound component having an alicyclic group in the molecules thereof and in which neighboring carbon atoms of the alicyclic group are forming an oxirane ring. There can be used epoxy compounds having at least one epoxycycloalkyl group such as epoxycyclohexyl group or epoxycyclopentyl group in the molecules thereof in a single kind or in combination.

As the alicyclic epoxy compound, there can be exemplified an alicyclic epoxy compound having two epoxycyclohexyl groups in a molecule thereof as will be described later, as well as vinylcyclohexene monoepoxide, vinylcyclohexene diepoxide, bis(2,3-epoxycyclopentyl)ether and the like.

It is desired that the alicyclic epoxy compound used in the invention is a difunctional compound having two epoxy groups in a molecule thereof.

That is, when the difunctional alicyclic epoxy compound is used, the crosslinked structure three-dimensionally expands less than when the trifunctional or more highly functional alicyclic epoxy compound is used, and there can be formed a densely crosslinked structure having excellent gas barrier property. Further, the film that is formed is not so hard or brittle as that of when the polyfunctional alicyclic epoxy compound is used, making it possible to obtain excellent flexibility after the retort sterilization and, therefore, to obtain satisfactory retort resistance.

As the difunctional alicyclic epoxy compound, there can be preferably used an alicyclic epoxy compound having, in a molecule thereof, at least one alicyclicepoxycy group, more preferably, epoxycycloalkyl group which has an alicyclic group and in which neighboring carbon atoms of the alicyclic group are forming an oxirane ring, particularly, epoxycyclohexyl group, most preferably, having two epoxycyclohexyl groups.

As the alicyclic epoxy compound having two epoxycyclohexyl groups in a molecule that can be particularly preferably used for the solution (b), there can, be exemplified, though not limited thereto only, (3,4-epoxy-6-methylcyclohexyl)methyl-3,4-epoxy-6-methylcyclohexane carboxylate, (3,4-epoxy-6-methylcyclohexyl)methyl-3,4-epoxycyclohexane carboxylate, bis(3,4-epoxycyclohexylmethyl)adipate, bis(3,4-epoxycyclohexyl)adipate, bis(3,4-epoxy-6-methylcyclohexylmethyl) adipate, 3,4-epoxy-6-methylcyclohexane carboxylate, 3,4-epoxy-6-methylcyclohexane carboxylate, and 3,4-epoxycyclohexylmethyl (3,4-epoxy)cyclohexane carboxylate, in addition to the alicyclic epoxy compounds represented by the above formula (1).

From the standpoint of mechanical properties and coloring, it is desired that an aliphatic chain is forming the crosslinked part that is formed by the polycarboxylic acid-type polymer and the alicyclic epoxy compound. Among the above alicyclic epoxy compounds, therefore, there can be preferably used those compounds without aromatic ring. Of them, the 3,4-epoxycyclohexylmethyl (3,4-epoxy)cyclohexane carboxylate can be particularly preferably used.

As the epoxycyclohexyl group-containing compound placed in the market, there can be exemplified such products as Cylacure UVR-6100, Cylacure UVR-6105, Cylacure UVR-6110, Cylacure UVR-6128 (which are the products of Dow Chemical Co.), Celloxide 2021, Celloxide 2021P, Celloxide 2081, Celloxide 2083, Celloxide 2085, Celloxide 3000, Epolead GT-300, Epolead GT-301, Epolead GT-302, Epolead GT-400, Epolead 401, Epolead 403 (which are the products of Daicel Chemical Industries, LTD.), and KRM-2100, KRM-2110 and KRM-2199 (which are the products of Asahi Denka Co.).

It is desired that the solution (b) contains the polycarboxylic acid-type polymer in an amount of 2 to 60% by weight and, specifically, 4 to 40% by weight so that excellent gas barrier property can be obtained.

As required, further, the solution (b) contains the crosslinking agent in an amount of 0.1 to 20 parts by weight per 100 parts by weight of the polycarboxylic acid-type polymer. If the amount thereof is smaller than the above range, the resistance against hot water cannot be so much improved. If the amount thereof is larger than the above range, on the other hand, it becomes disadvantageous in economy, the carboxyl groups are not sufficiently crosslinked with polyvalent metal ions, and the gas barrier property cannot be improved.

The solution (b) can be prepared by preparing a polycarboxylic acid polymer solution by using a solvent which contains at least water, thereafter adding the crosslinking agent directly thereto if it can be dissolved therein, or can be prepared by preparing a polycarboxylic acid-type polymer solution by using a solvent which contains at least water, dissolving the crosslinking agent in another solvent in which the crosslinking agent can be dissolved and which is capable of maintaining the state of solution after being added to the solution of the polycarboxylic acid polymer, thereafter adding the crosslinking agent solvent to the solution of the polycarboxylic acid-type polymer.

An acid or basic catalyst may be added to accelerate the reaction of the carboxyl groups in the polycarboxylic acid-type polymer with the crosslinking agent.

As the acid catalyst, there can be exemplified monovalent acids such as acetic acid, propionic acid, ascorbic acid, benzoic acid, hydrochloric acid, paratoluenesulfonic acid, and alkylbenzenesulfonic acid, and divalent or more highly valent acids such as sulfuric acid, sulfurous acid, phosphoric acid, phosphorous acid, hypophosphorous acid, polyphosphoric acid, pyrophosphoric acid, maleic acid, itaconic acid, fumaric acid, and polycarboxylic acid.

As the basic catalyst, there can be exemplified hydroxides of alkali metals or alkaline earth metals, such as sodium hydroxide, potassium hydroxide, lithium hydroxide, calcium hydroxide and barium hydroxide; ammonia; primary monoamines such as ethylamine, propylamine, butylamine, benzylamine, monoethanolamine, neopentanolamine, 2-aminopropanol and 3-aminopropanol; secondary monoamines such as diethylamine, diethanolamine, di-n- or di-iso-propanolamine, N-methylethanolamine and N-ethylethanolamine; tertiary monoamines such as dimethylethanolamine, trimethylamine, triethylamine, triisopropylamine, methyldiethanolamine and dimethylaminoethanol; and polyaminetriethylamines such as diethylenetriamine, hydroxyethylaminoethylamine, ethylaminoethylamine and methylaminopropylamine.

The solution (b) may, further, contain an inorganic dispersant in addition to the above components. The inorganic dispersant works to block the water content from the exterior, to protect the gas barrier material and to, further, improve the gas barrier property and water resistance.

The inorganic dispersion may assume any shape such as spherical shape, needle-like shape or laminar shape but is the one having wettability to the polycarboxylic acid-type polymer and the crosslinking agent that is added as required and, disperses well in the solution (b). From the standpoint of blocking the water, in particular, a silicate compound having a laminar crystal structure is, preferably, used, such as water-swelling mica or clay. It is desired that the inorganic dispersion has an aspect ratio of not less than 30 but not more than 5,000 from the standpoint of being dispersed in a laminar to block the water.

It is desired that the inorganic dispersion is contained in an amount of 5 to 100 parts by weight per 100 parts by weight of the total amount of the polycarboxylic acid-type polymer and the crosslinking agent.

(Plastic Base Material)

In the invention, the plastic base material on which the coating composition (a) is to be applied will be any packing material of the form of film, sheet, bottle, cup, tray or can produced from a thermoformable thermoplastic resin through such means as extrusion molding, injection molding, blow molding, stretch-blow molding or press molding.

Preferred examples of the resin for constituting the plastic base material include olefin copolymers such as low-, intermediate- or high-density polyethylene, linear low-density polyethylene, polypropylene, ethylene/propylene copolymer, ethylene/butene copolymer, ionomer, ethylene/vinyl acetate copolymer and ethylene/vinyl alcohol copolymer; polyesters such as polyethylene terephthalate, polybutylene terephthalate, polyethylene terephthalate/isophthalate and polyethylene naphthalate; polyamides such as nylon 6, nylon 6,6, nylon 6,10 and methaxylylene adipamide; styrene copolymers such as polystyrene, styrene/butadiene block copolymer, styrene/acrylonitrile copolymer and styrene/butadiene/acrylonitrile copolymer (ABS resin); vinyl chloride copolymers such as polyvinyl chloride and vinyl chloride/vinyl acetate copolymer; acrylic copolymers such as polymethylmethacrylateandmethylmethacrylate•ethylacrylate copolymer; and polycarbonate.

These thermoplastic resins may be used alone or in the form of a blend of two or more kinds thereof. Further, the plastic base material may be constituted as a single layer or as a laminate of two or more layers formed by lamination such as a simultaneous melt extrusion.

As required, further, the above melt-moldable thermoplastic resin may be blended with one or two or more kinds of additives such as pigment, antioxidant, antistatic agent, ultraviolet ray absorber and lubricant in a total amount in a range of 0.001 parts to 5.0 parts per 100 parts by weight of the resin.

In order to reinforce the container, further, the thermoplastic resin may be blended with one or two or more kinds of fibrous reinforcing materials such as glass fiber, aromatic polyamide fiber, carbon fiber, pulp and cotton linter; powdery reinforcing materials such as carbon black and white carbon; or flake-like reinforcing materials such as glass flake and aluminum flake; in a total amount of 2 to 150 parts by weight per 100 parts by weight of the thermoplastic resin. As fillers, further, the thermoplastic resin may be blended with one or two or more kinds of heavy or soft calcium carbonate, mica, talc, kaolin, gypsum, clay, barium sulfate, alumina powder, silica powder and magnesium carbonate in a total amount of 5 to 100 parts by weight per 100 parts by weight of the thermoplastic resin according to a known recipe without any problem.

In order to improve the gas barrier property, further, the thermoplastic resin may be blended with a scale-like inorganic fine powder such as water-swelling mica and clay in a total amount of 5 to 100 parts by weight per 100 parts by weight of the thermoplastic resin according to a known recipe without any problem.

Further, the plastic base material may be a finally obtained film, a sheet, or a molded article such as container, and the preform for forming the container may be provided with the coating thereof in advance. As the preform, there can be exemplified a cylindrical parison with or without bottom for biaxial stretch-blow forming, a pipe for forming a plastic can, a sheet for vacuum forming, pressure forming or plug-assisted forming, and a film for heat sealed lid and for forming bags.

(Production of the Gas Barrier Laminates)

In the method of preparing the gas barrier laminate of the present invention, first, the above coating composition (a) is applied onto at least one surface of the above plastic base material.

The amount of the coating composition (a) to be applied is determined depending upon the charged amounts of the resin component and the alkaline compound of the polyvalent metal in the coating composition (a) and cannot be definitely specified. The coating composition (a), however, is preferably applied in such an amount that the amount of the resin component is in a range of 0.02 to 5.0 $g/m^2$ and, specifically, 0.1 to 2.0 $g/m^2$ in the layer (A) that is formed and that the amount of the polyvalent metal ions is, as described above, not less than 0.4 equivalents with respect to the carboxyl groups of the polycarboxylic acid-type polymer in the solution (b) that is applied thereafter.

If the amount of the resin component is smaller than the above range, it becomes difficult to adhere the layer (A) to the plastic base material. Even if the amount of the resin component is larger than the above range, on the other hand, there is obtained no particular advantage but disadvantage in economy.

Though dependent upon the kind and the applied amount of the coating material that is used, the layer (A) can be formed by applying the coating composition (a) onto the plastic base material and drying it at a temperature of 50 to 200° C. for 0.5 seconds to 5 minutes and, specifically, at a temperature of 70 to 140° C. for 1 second to 2 minutes. The layer (A) is thus economically formed without affecting the plastic base material.

Next, the solution (b) is applied onto the layer (A) that is formed. It is desired that the amount of the polycarboxylic acid-type polymer in the resin composition in the solution (b), i.e., the amount of the free carboxyl groups contained in the resin composition in the solution (b) is at least not less than 150 KOH mg/g and, specifically, in a range of 250 to 970 KOH mg/g calculated as an acid value. Here, the acid value is a number of milligrams of the potassium hydroxide necessary for neutralizing the acidic free functional groups contained in a gram of the resin, and is found by an ordinary method based on the neutralization titration with alkali. It is desired to apply the solution (b) in such an amount that, before the ionic crosslinking is formed in the layer (B), only the amount of the resin component is in a range of 0.3 to 4.5 $g/m^2$ and, specifically, 0.5 to 3.0 $g/m^2$ in dry state. If the applied amount thereof is smaller than the above range, barrier property is not obtained to a sufficient degree. Even if the amount of the resin component is larger than the above range, on the other hand, no particular advantage is obtained but disadvantage in economy.

Next, the solution (b) that is applied is heat-treated. Here, in the invention, the polyvalent metal ions in the layer (A) migrate into the solution (b) during the heat treatment, and a crosslinked structure is formed among the carboxyl groups in the polycarboxylic acid-type polymer. When a crosslinking agent is contained in the solution (b), further, a crosslinked structure by covalent bond is also formed among the carboxyl groups in the polycarboxylic acid-type polymer due to the crosslinking agent.

It is desired that the solution (b) is heated under the conditions of a temperature of 30 to 140° C. and, specifically, 40 to 120° C. for 0.1 second to 1 minute and, more preferably, for 1 second to 30 seconds.

The above coating composition (a) and the solution (b) can be applied, dried and heat-treated in a customary manner.

Though not limited thereto only, the application can be carried out by, for example, spray coating, dipping or by using a bar coater, roll coater or gravure coater.

Further, the drying or heat treatment is conducted by oven drying (heating), infrared ray heating or high-frequency heating.

(Gas Barrier Laminates)

The gas barrier laminate produced by the production method of the invention comprises two layers formed on at least one surface of the plastic base material. The lower layer formed on the plastic base material is a coating which closely and excellently adheres onto the plastic base material. On this coating is formed a gas barrier layer in which the carboxyl groups of the polycarboxylic acid-type polymer are crosslinked with polyvalent metal ions to a ratio of not less than 20% and, specifically, not less than 30%.

When the gas barrier layer is blended with the crosslinking agent, further, the crosslinked structure by covalent bond is formed among the carboxyl groups of the polycarboxylic acid-type polymer and, specifically, an ester bond or an amide ester bond is formed so that the gas barrier layer exhibits very excellent resistance against the hot water.

In the gas barrier laminate produced by the production method of the present invention, the gas barrier layer itself exhibits gas barrier property to a sufficient degree. That is, the gas barrier property and retort resistance are as excellent as an oxygen permeation amount (in compliance with the JIS K-7126) of not more than 0.5 $cm^3/m^2 \cdot day \cdot atm$ (in an environment of 25° C.-80% RH) before the retort treatment and an oxygen permeation amount of not more than 1 cm³/m²·day·atm (in an environment of 25° C.-80% RH) even after the retort treatment. In the tests shown in Examples described below, further, the gas barrier laminates were evaluated for their flexibilities in terms of the oxygen permeation amount after the retort treatment and after crushed 100 times by using the Gelvo type Frex-Cracking Tester to find that the flexibilities were as excellent in terms of the oxygen permeation amount as not more than 15 cm³/m²·day·atm (in an environment of 25° C.-80% RH).

EXAMPLES

The invention will be further described by way of the following Examples by which, however, the invention is in no way limited.
(Oxygen Permeation Amount)
The amount of oxygen that permeates through the laminate of the obtained plastic films was measured by using an oxygen permeation amount-measuring instrument (OX-TRAN 2/20 manufactured by Modern Control Co.). The oxygen permeation amount was, further, measured after the retort sterilization treatment of 121° C.-30 minute. The measurement was taken under the conditions of an environmental temperature of 25° C. and a relative humidity of 80%.
(Evaluating the Flexibility)
A laminate of the obtained plastic films was subjected to the retort sterilization treatment of 121° C.-30 minute, was cut into a size of 130 mm×100 mm, was formed into a cylinder of 30 mmϕ and 130 mm long, and was attached to the Gelvo type Frex-Cracking Tester. By using the Gelvo type Frex-Cracking Tester, the crush treatment was conducted 100 times in an environment of a temperature of 23° C. and a relative humidity of 50% RH. One time of the crush treatment consisted of a twisting motion (twisting angle of 180° C. and a moving length of 60 mm) and a horizontal motion (moving length of 20 mm). Thereafter, the oxygen permeation amount was measured as described above.
(Method of Calculating the Ionic Crosslinking Ratio)
The ionic crosslinking ratio is calculated by using the gas barrier laminate after ionically crosslinked and by using a Fourier transform infrared spectrophotometer. Upon the formation of the ionic crosslinking, the carboxylic acid is converted into the carboxylate. Usually, it has been known that the carboxylic acid has characteristic absorption bands at wavelengths near 920 to 970 cm⁻¹, near 1700 to 1710 cm and near 2500 to 3200 cm⁻¹ and that the acid anhydride thereof has it at the wavelengths near 1770 to 1800 cm⁻¹. Further, it has been known that the carboxylate has a characteristic absorption band at wavelengths near 1480 to 1630 cm⁻¹. The ionic crosslinking ratio is calculated by using peak heights of the carboxylic acid and the acid anhydride thereof having vertexes in the wavelength region of 1600 to 1800 cm⁻¹, and a peak height of the carboxylate having a vertex in the wavelength region of 1480 to 1630 cm⁻¹. More desirably, there are used peak heights of those having vertexes in the wavelength regions of (i) 1695 to 1715 cm⁻¹ and (ii) 1540 to 1610 cm⁻¹. The peak heights are obtained by detecting the infrared absorption spectra of the samples and by measuring the absorbencies at the wavelengths of (i) and (ii). The carboxylic acid and the carboxylates are regarded to have the same coefficient of absorbency, and the ratio of conversion of the carboxyl groups into the salt thereof (ratio by which the carboxylic acid was converted into the carboxylate thereof) is calculated, i.e., the ionic crosslinking ratio X is calculated according to the following formula (1), $$X = \text{Peak height of}(ii)/[\text{peak height of}(i)+\text{peak height of}(ii)] \quad (1)$$

where the peak heights of (i) and (ii) are the differences in the absorbencies between the peak points and the points at where the hems of peaks are overlapping the base line.
(Measuring Conditions of the Fourier Transform Infrared Spectrophotometer)
Instrument used: FTS 7000 Series, manufactured by Digilab Co.
Measuring method: single reflection method using a germanium prism.
Measuring wavelength region: 4000 to 700 cm⁻¹
(Method of Evaluating Metal Element in the Non-Aqueous Resin Contained in the Layer (A))
Presence of the metal element contained in the non-aqueous resin is judged relying on a measurement by using a fluorescent X-ray spectroscopy. It has been known that the value obtained by using the fluorescent X-ray spectroscopy, usually, varies depending upon the diameter of measurement, X-ray output, measuring time and thickness of the sample. Therefore, differences due to the materials were evaluated by taking measurement under the fixed conditions of measuring the Na—Kα ray, setting the diameter being measured to be 30 mm, X-ray output to be 50 kV-70 mA, measuring time to be 40 s, and the thickness of the sample to be not more than 1 mm. The samples for measurement are prepared by working the resin by using a hot press or by applying the resin by using a bar coater. By taking measurement under these conditions, further, the samples from which peaks were detected based on the Na—Kα ray were judged to be the resins containing metal element in the non-aqueous polymer skeleton thereof. The results are as shown in Table 1.
(Measuring Conditions of the Fluorescence X-Ray Analyzer)
Instrument used: ZSX100e, manufactured by Rigaku Denki Co.
Measuring conditions: Object to be measured, Na—Kα ray
Measuring diameter, 30 mm
X-ray output, 50 kV-70 mA
Measuring time, 40 s
(Test for Swelling the Non-Aqueous Resins)
Water-swelling properties of the used non-aqueous resins were evaluated by dipping the resin sheets (3 cm×3 cm, 2 mm thick) in a solvent of water/acetone=50/50. The evaluation was based on the eye. The resins which were whitened and swollen were evaluated to possess favorable swelling property ○ and the resins which exhibited no change in the properties were evaluated to possess poor swelling property X. The results are as shown in Table 1.

Example 1

To a polyester polyol (Vylon V240 manufactured by TOYOBO CO., LTD) dissolved in a mixed solvent of ethyl acetate/2-butanone (weight ratio of 65/35), there was so added a calcium carbonate (CS3N-A manufactured by Ube Material Industries, Ltd., primary grain size: 0.3 μm) that the amount thereof was 400% by weight relative thereto so that the total solid content was 35%, and the mixture was dispersed by a mill by using glass beads (BZ-04 manufactured by Toshinriko Co.) to obtain a paste thereof. To the paste, there was added a polyisocyanate (Sumijule N3300 manufactured by Sumika Bayer Urethane Co., Ltd., isocyanurate based on a 1,6-hexamethylene diisocyanate) in an amount of 30% by weight relative to the polyester polyol, and the mixture was prepared by using the above mixed solvent so that the total solid content was 25% by weight to thereby obtain a coating solution (a') comprising the coating composition (a) containing the alkaline compound of the polyvalent metal.
By using a bar coater, the coating solution (a') was applied onto a biaxially stretched polyethylene terephthalate film 2 having a thickness of 12 μm, and was heat-treated in a boxtype electric oven under the conditions of a temperature set at 70° C. for a treating time of 2 minutes to obtain a polyethylene terephthalate film having a layer 3 corresponding to the layer (A) of an applied amount of 1.4 g/m².

A polyacrylic acid (AC-10LP manufactured by Nihon Junyaku Co.) as the polycarboxylic acid-type polymer was dissolved in a water/acetone mixed solvent (weight ratio of 50/50) in such an amount that the solid content thereof was 10% by weight to obtain the solution (b).

By using the bar coater, the solution (b) was applied onto the layer 3 of the polyethylene terephthalate film that possessed the layer 3 so that the amount applied thereof was 1.5 g/m² to form a precursor layer (B). Here, the applied amount of the precursor layer (B) stands for the applied amount found by directly applying the solution (b) onto the biaxially stretched polyethylene terephthalate film and drying it, i.e., drying the polyacrylic acid only in the solution (b) without causing the ionic crosslinking to be formed. The film after applied was heat-treated in a conveyer-type electric oven under the conditions of a temperature set at 60° C. and a pass time of 5 seconds to form a polyethylene terephthalate film having, on the layer 3, a layer 4 forming the ionic crosslinking in the precursor layer (B), i.e., to obtain a gas barrier laminate.

With the coating of the gas barrier laminate as the lower layer, there were further laminated a layer 5 of an urethane adhesive of a thickness of 2 μm, a biaxially stretched nylon film 6 of a thickness of 15 μm, a layer 7 of an urethane adhesive of a thickness of 2 μm and an unstretched polypropylene film 8 of a thickness of 70 μm, successively, to obtain a laminate 1 of a layer constitution as shown in FIG. 1.

Example 2

In Example 1, a laminate was obtained by the same method as that of Example 1 but heat-treating the solution (b) in the conveyer-type electric oven at a temperature set at 60° C. and a pass time of 2 seconds.

Example 3

In Example 1, a laminate was obtained by the same method as that of Example 1 but heat-treating the solution (b) in the conveyer-type electric oven at a temperature set at 60° C. and a pass time of 15 seconds.

Example 4

In Example 1, a laminate was obtained by the same method as that of Example 1 but using the calcium hydroxide (manufactured by Wako Pure Chemical Industries, Ltd.) instead of the calcium carbonate in the coating solution (a'), and applying the layer (A) in an amount of 1.1 g/m² and the layer (B) in an amount of 1.16 g/m².

Example 5

In Example 1, a laminate was obtained by the same method as that of Example 1 but using the magnesium carbonate (manufactured by Wako Pure Chemical Industries, Ltd.) instead of the calcium carbonate in the coating solution (a'), and applying the layer (A) in an amount of 1.2 g/m².

Example 6

In Example 1, a laminate was obtained by the same method as that of Example 1 but using the magnesium hydroxide (manufactured by Wako Pure Chemical Industries, Ltd.) instead of the calcium carbonate in the coating solution (a'), and applying the layer (A) in an amount of 0.85 g/m².

Example 7

In Example 1, a laminate was obtained by the same method as that of Example 1 but so adding a 3,4-epoxycyclohexane carboxylate (Cylacure UVR-6110 manufactured by Dow Chemical Co.) that the amount thereof was 0.5% by weight relative to the polyacrylic acid in the solution (b).

Example 8

In Example 1, a laminate was obtained by the same method as that of Example 1 but partly neutralizing 10 mol % of the carboxyl groups of the polyacrylic acid in the solution (b) with the sodium hydroxide.

The ionic crosslinking ratio was calculated by subtracting the ratio of partial neutralization.

Example 9

Figure 2:
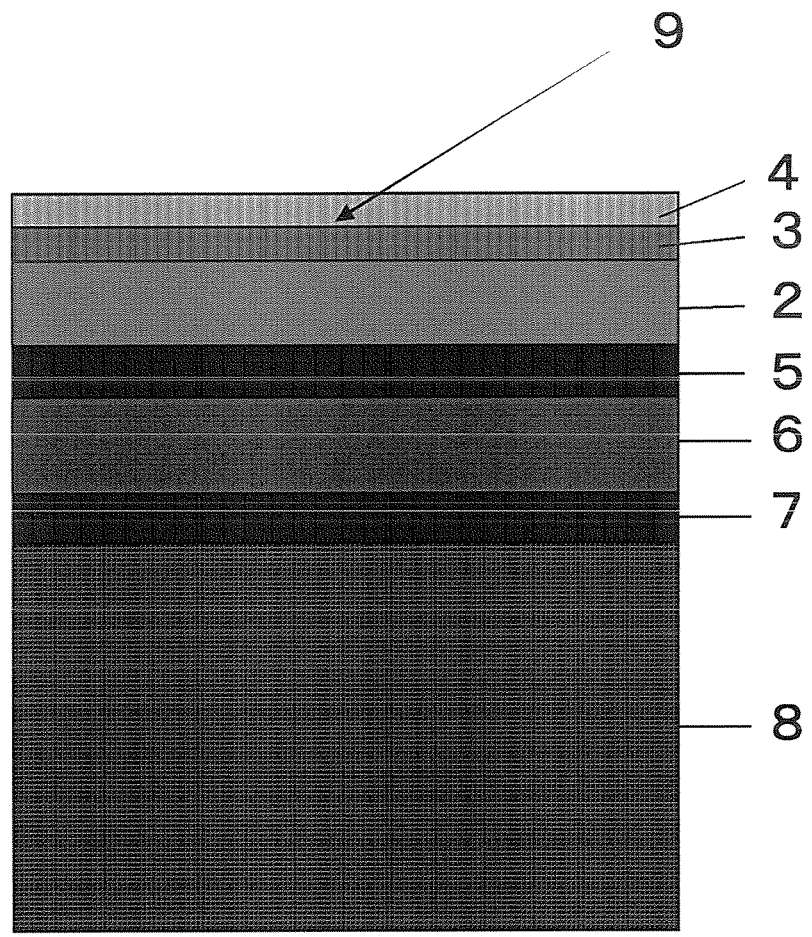
FIG. 2 is a view showing the structure in cross section of a laminated fabricated in Example 9.

In Example 1, the coating of the gas barrier laminate was rendered to be on the outer side instead of rendering it to be the lower layer, and there were laminated the layer 5 of an urethane adhesive of a thickness of 2 μm, the biaxially stretched nylon film 6 of a thickness of 15 μm, the layer 7 of an urethane adhesive of a thickness of 2 μm and the unstretched polypropylene film 8 of a thickness of 70 μm, successively, to obtain a laminate 9 of a layer constitution as shown in FIG. 2.

Comparative Example 1

In Example 1, a laminate was obtained by the same method as that of Example 1 but using a non-aqueous resin Vylon (V-200 manufactured by TOYOBO CO., LTD) containing no monovalent metal element in the polymer skeleton thereof instead of using the polyester polyol in the coating solution (a').

Comparative Example 2

In Example 1, a laminate was obtained by the same method as that of Example 1 but using a non-aqueous resin (Vylon V-200 manufactured by TOYOBO CO., LTD) containing no monovalent metal element in the polymer skeleton thereof instead of using the polyester polyol in the coating solution (a') and adding the sodium hydroxide (manufactured by Wako Pure Chemical Industries, Ltd.) in an amount of 5% by weight relative to the chief resin component.

TABLE 1

| | | | Layer (A) containing alkaline compound of polyvalent metal | | | | | |
|---|---|---|---|---|---|---|---|---|
| | Non-aq. Resin | Metal element in resin skeleton | Water-swelling prop. of non-aq. Resin | Curing agent | Ca compound species | Monovalent metal added (amount) | Amount added | Amount applied (g/m²) | Polyvalent metal equivalent (eq) |
| Ex. 1 | *1 | yes | ○ | *2 | *3 | no | 200 | 1.4 | 0.9 |
| Ex. 2 | *1 | yes | ○ | *2 | *3 | no | 200 | 1.4 | 0.9 |
| Ex. 3 | *1 | yes | ○ | *2 | *3 | no | 200 | 1.4 | 0.9 |

TABLE 1-continued

| | | | | | | | | | |
|---|---|---|---|---|---|---|---|---|---|
| Ex. 4 | *1 | yes | ○ | *2 | *4 | no | 200 | 1.1 | 0.9 |
| Ex. 5 | *1 | yes | ○ | *2 | *5 | no | 200 | 1.2 | 0.9 |
| Ex. 6 | *1 | yes | ○ | *2 | *6 | no | 200 | 0.85 | 0.9 |
| Ex. 7 | *1 | yes | ○ | *2 | *3 | no | 200 | 1.4 | 0.9 |
| Ex. 8 | *1 | yes | ○ | *2 | *3 | no | 200 | 1.4 | 0.9 |
| Ex. 9 | *1 | yes | ○ | *2 | *3 | no | 200 | 1.4 | 0.9 |
| Comp. Ex. 1 | *1 | no | X | *2 | *3 | no | 200 | 1.4 | 0.9 |
| Comp. Ex. 2 | *1 | no | X | *2 | *3 | *7 | 200 | 1.4 | 0.9 |

| | Precursor layer (B) | | | | | |
|---|---|---|---|---|---|---|
| | Partial neutralization of polyacrylic acid | Crosslinking agent (amount) | Solvent composition (wt. ratio) | Amount applied (g/m$^2$) | Oven condition (conveyer type) | Remarks |
| Ex. 1 | no | no | water/acetone = 50/50 | 1.5 | 60° C. - 5 Sec. | |
| Ex. 2 | no | no | water/acetone = 50/50 | 1.5 | 60° C. - 2 Sec. | |
| Ex. 3 | no | no | water/acetone = 50/50 | 1.5 | 60° C. - 15 Sec. | |
| Ex. 4 | no | no | water/acetone = 50/50 | 1.16 | 60° C. - 5 Sec. | |
| Ex. 5 | no | no | water/acetone = 50/50 | 1.5 | 60° C. - 5 Sec. | |
| Ex. 6 | no | no | water/acetone = 50/50 | 1.5 | 60° C. - 5 Sec. | |
| Ex. 7 | no | *8 | water/acetone = 50/50 | 1.5 | 60° C. - 5 Sec. | |
| Ex. 8 | yes | no | water/acetone = 50/50 | 1.5 | 60° C. - 5 Sec. | |
| Ex. 9 | no | no | water/acetone = 50/50 | 1.5 | 60° C. - 5 Sec. | *9 |
| Comp. Ex. 1 | no | no | water/acetone = 50/50 | 1.5 | 60° C. - 5 Sec. | *10 |
| Comp. Ex. 2 | no | no | water/acetone = 50/50 | 1.5 | 60° C. - 5 Sec. | *11 |

*1: polyester polyol
*2: polyisocyanate
*3: Ca carbonate
*4: Ca hydroxide
*5: Mg carbonate
*6: Mg hydroxide
*7: Na hydroxide, 5 wt %
*8: 0.5 wt % (3,4-epoxycyclohexylmethyl(3,4-epoxy)cyclohexane carboxylate)
*9: coating as an outer layer
*10: no monovalent metal element in the non-aq. resin skeleton
*11: monovalent metal element is added to coating solution (a')

Table 2 shows the measured results of the ionic crosslinking ratios of the obtained gas barrier laminates, oxygen permeation amounts of the obtained laminates before and after the retort treatment, and oxygen permeation amounts after the retort treatment and after the crush treatment conducted 100 times by using the Gelvo type Frex-Cracking.

In all of Examples 1 to 9, favorable barrier properties were exhibited both before and after the retort treatment, and flexibilities after the crush treatment were evaluated to be favorable.

TABLE 2

| | Ionic crosslinking ratio (%) | Oxygen permeation amount (cm$^3$/m$^2$ · day · atm)$^{note\ 1}$ | | | Remarks |
|---|---|---|---|---|---|
| | | Before retort treatment | After retort treatment | After retort and 100 times of crush | |
| Ex. 1 | 64 | <0.05 | 0.03 | 4.4 | |
| Ex. 2 | 32 | <0.05 | 0.06 | 4.6 | |
| Ex. 3 | 88 | <0.05 | 0.04 | 4.1 | |
| Ex. 4 | 63 | <0.05 | 0.12 | 4.2 | |
| Ex. 5 | 64 | <0.05 | 0.04 | 4.2 | |
| Ex. 6 | 62 | <0.05 | 0.08 | 5.3 | |
| Ex. 7 | 61 | <0.05 | 0.14 | 5.6 | |
| Ex. 8 | 62 | <0.05 | 0.02 | 3.8 | |
| Ex. 9 | 60 | <0.05 | 0.04 | 6.1 | coating was on the outer side |
| Comp. Ex. 1 | 18 | 0.6 | 1.5 | 17.0 | |
| Comp. Ex. 2 | 19 | 0.8 | 2.0 | 15.5 | |

*Note 1*

Favorable if the permeation amount is less than 0.5 cm$^3$/m$^2$ · day · atm. before and after the retort treatment, is less than 1 cm$^3$/m$^2$ · day · atm. after the retort treatment, and is 15 cm$^3$/m$^2$ · day · atm. after the crush treatment.

INDUSTRIAL APPLICABILITY

The gas barrier laminate of the present invention has a gas barrier layer formed by crosslinking the carboxyl groups of the polycarboxylic acid-type polymer with polyvalent metal ions, and exhibits superior gas barrier properties to those of the conventional laminates. Besides, the gas barrier laminate features excellent adhesion to the base material, retort resistance and flexibility, and can be favorably used in the field of packing containers that are subjected to be exposed to high temperatures and wet heated conditions such as retort sterilization.

According to the method of producing the gas barrier laminate of the invention, further, there is no need of conducting the dip treatment or the spray treatment that was, so far, necessary for forming gas barrier material by crosslinking the carboxyl groups of the polycarboxylic acid-type polymer with polyvalent metal ions, the number of the steps can be decreased, the crosslinked structure can be easily formed relying only upon the heating at a low temperature for a short period of time making it possible to shorten the production time requiring decreased amounts of energy without adversely affecting the plastic base material and, therefore, to form the gas barrier material maintaining good productivity and economically.

DESCRIPTION OF REFERENCE NUMERALS

1,9: laminates
2: biaxially stretched polyethylene terephthalate film of a thickness of 12 μm
3: layer (A) containing an alkaline compound and a non-aqueous resin that contains a metal element in the polymer skeleton thereof.
4: a layer forming a metal ionic crosslinking among the carboxyl groups of the polycarboxylic acid polymer in a precursor layer (B)
5, 7: urethane adhesive layers of a thickness of 2 μm
6: biaxially stretched nylon film of a thickness of 15 μm
8: unstretched polypropylene film of a thickness of 70 μm

The invention claimed is:

1. A gas barrier laminate comprising a layer (A) of a non-aqueous resin containing a metal element in the polymer skeleton thereof, and a layer (B) of a polycarboxylic acid-type polymer in which an ionic crosslinking is formed with a polyvalent metal among the carboxyl groups.

2. The gas barrier laminate according to claim 1, wherein said metal element of the layer (A) is a monovalent metal element.

3. The gas barrier laminate according to claim 1, wherein an urethane bond is formed in the non-aqueous resin of said layer (A).

4. The gas barrier laminate according to claim 1, wherein an alkaline compound of a polyvalent metal is contained in said layer (A).

5. The gas barrier laminate according to claim 4, wherein the alkaline compound of said polyvalent metal comprises at least one of a carbonate of calcium or magnesium, or a hydroxide thereof.

6. The gas barrier laminate according to claim 1, wherein said polycarboxylic acid-type polymer is a poly(meth)acrylic acid or a partly neutralized product thereof.

7. The gas barrier laminate according to claim 1, wherein the polyvalent metal in said layer (B) comprises at least one of calcium or magnesium.

8. A packing material having the gas barrier laminate of claim 1 on the surface of a plastic base material or between the plastic layers.

9. A method of producing a gas barrier laminate, comprising forming a layer (A) on at least one surface of a plastic base material, the layer (A) being formed by dispersing an alkaline compound of a polyvalent metal in a non-aqueous resin which contains a metal element in the polymer skeleton thereof, applying a solution (b) onto the layer (A), the solution (b) being obtained by dissolving a polycarboxylic acid-type polymer in a solvent which contains at least water and, thereafter, removing the solvent by the heat treatment to thereby form a metal ionic crosslinking with polyvalent metal ions among the carboxyl groups in the solution (b).

* * * * *